United States Patent
Mao

(10) Patent No.: US 10,445,516 B1
(45) Date of Patent: Oct. 15, 2019

(54) SYSTEMS AND METHODS FOR PREVENTING VULNERABLE FILES FROM BEING OPENED

(71) Applicant: Symantec Corporation, Mountain View, CA (US)

(72) Inventor: Jun Mao, Torrance, CA (US)

(73) Assignee: Symantec Corporation, Mountain View, CA (US)

( * ) Notice: Subject to any disclaimer, the term of this patent is extended or adjusted under 35 U.S.C. 154(b) by 114 days.

(21) Appl. No.: 14/958,370

(22) Filed: Dec. 3, 2015

(51) Int. Cl.
*G06F 11/00* (2006.01)
*G06F 21/62* (2013.01)
*G06F 21/57* (2013.01)

(52) U.S. Cl.
CPC ........ *G06F 21/6218* (2013.01); *G06F 21/577* (2013.01)

(58) Field of Classification Search
CPC ... G06F 21/6218; G06F 21/577; G06F 21/561
See application file for complete search history.

(56) References Cited

U.S. PATENT DOCUMENTS

| | | | | |
|---|---|---|---|---|
| 8,468,600 B1* | 6/2013 | Kaskel | ............. | G06F 21/53 726/22 |
| 8,627,476 B1* | 1/2014 | Satish | ............. | G06F 21/51 713/187 |
| 2009/0044024 A1* | 2/2009 | Oberheide | ............. | G06F 21/562 713/188 |
| 2011/0246753 A1* | 10/2011 | Thomas | ............. | G06F 21/56 713/1 |

OTHER PUBLICATIONS

"Android intent filter: associate app with file extension", http://stackoverflow.com/questions/3760276/android-intent-filter-associate-app-with-file-extension, as accessed Oct. 30, 2015, Stack Overflow, (Sep. 21, 2010).

Z TEAM, "Experts Found a Unicorn in the Heart of Android", http://blog.zimperium.com/experts-found-a-unicorn-in-the-heart-of-android/, as accessed Oct. 30, 2015, Zimperium, (Jul. 27, 2015).

* cited by examiner

*Primary Examiner* — David Garcia Cervetti
*Assistant Examiner* — Carlton Johnson
(74) *Attorney, Agent, or Firm* — FisherBroyles, LLP

(57) ABSTRACT

A computer-implemented method for preventing vulnerable files from being opened may include (1) registering a security application as a universal file opener, (2) receiving, at the security application, a request to open a file, (3) identifying at least one other application on the computing device that is capable of opening the file, (4) determining, based on a security analysis, that there is a security risk in opening the file with the other application that is capable of opening the file, and (5) preventing the other application that is capable of opening the file from opening the file. Various other methods, systems, and computer-readable media are also disclosed.

20 Claims, 6 Drawing Sheets

SYSTEMS AND METHODS FOR PREVENTING VULNERABLE FILES FROM BEING OPENED

BACKGROUND

Software applications may provide devices with additional functionality that is not originally built into the devices. For example, smart phone users may download mobile apps to increase productivity or for entertainment. However, devices are often susceptible to malicious applications that may package malware in the installation bundles of the applications themselves. When a user downloads a compromised application, the malware may gain access to the device.

Security software traditionally attempts to monitor applications that run on a device in order to identify malware and mitigate threats. However, in some cases, a vulnerable application might open other files that are harmful, even if the application itself is not an immediate threat. For example, a user may use an application that has no internal security controls to download and open a malicious media file. In these cases, traditional security measures may be unable to directly access and evaluate the harmful files being opened through the vulnerable application. Additionally, in other cases, user interaction may not even be necessary in order for the vulnerable application to attempt to open a malicious file. Thus, malware can take advantage of application vulnerabilities or coordinate with malicious applications to infect devices without being detected by traditional security software. Accordingly, the instant disclosure identifies and addresses a need for additional and improved systems and methods for preventing vulnerable files from being opened.

SUMMARY

As will be described in greater detail below, the instant disclosure describes various systems and methods for preventing vulnerable files from being opened by intercepting potentially risky files to be opened in order to first analyze the files for security risks. Additionally, the disclosed system may analyze and detect vulnerabilities in applications that may be used to open the potentially vulnerable files. The disclosed system may then prevent the potentially vulnerable files from being opened by vulnerable applications. Furthermore, when a file is determined to be safe, this system may select a safe application to open the file.

In one example, a computer-implemented method for preventing vulnerable files from being opened may include (1) registering a security application as a universal file opener, (2) receiving, at the security application, a request to open a file, (3) identifying at least one other application on a computing device that is capable of opening the file, (4) determining, based on a security analysis, that there is a security risk in opening the file with the other application that is capable of opening the file, and (5) preventing the other application that is capable of opening the file from opening the file. In some embodiments, the request to open the file may include a request from a user of the computing device and/or an origin application on the computing device.

In some examples, identifying the other application that is capable of opening the file may include detecting a file type for the file. Additionally or alternatively, identifying the other application that is capable of opening the file may include determining that the other application is registered as a file opener for the file type.

In one embodiment, the security analysis may include an analysis of the file. In this embodiment, the analysis of the file may include a security scan of the file, detection of the file name, an analysis of a reputation of the file based on the file name, and/or an analysis of an origin of the file. In another embodiment, the security analysis may include an analysis of the other application that is capable of opening the file. Additionally or alternatively, in a further embodiment, the security analysis may include an evaluation of a risk of opening the file with the other application that is capable of opening the file.

In one example, the computer-implemented method may further include determining, based on the security analysis, at least one safe application on the computing device that is capable of opening the file and sending, based on a selection of the safe application, the request to open the file to the safe application. In this example, the selection of the safe application may include a choice of the safe application by a user of the computing device and/or an automated selection of the safe application to open the file. Furthermore, in this example, the automated selection may include a determination that the safe application is the best application on the computing device to open the file based on a predetermined metric.

In one embodiment, a system for implementing the above-described method may include (1) a registration module, stored in memory, that registers a security application as a universal file opener, (2) a reception module, stored in memory, that receives, at the security application, a request to open a file, (3) an identification module, stored in memory, that identifies at least one other application on the computing device that is capable of opening the file, (4) a determination module, stored in memory, that determines, based on a security analysis, that there is a security risk in opening the file with the other application that is capable of opening the file, and (5) a prevention module, stored in memory, that prevents the other application that is capable of opening the file from opening the file. In addition, the system may include at least one processor that executes the registration module, the reception module, the identification module, the determination module, and the prevention module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) register a security application as a universal file opener, (2) receive, at the security application, a request to open a file, (3) identify at least one other application on the computing device that is capable of opening the file, (4) determine, based on a security analysis, that there is a security risk in opening the file with the other application that is capable of opening the file, and (5) prevent the other application that is capable of opening the file from opening the file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
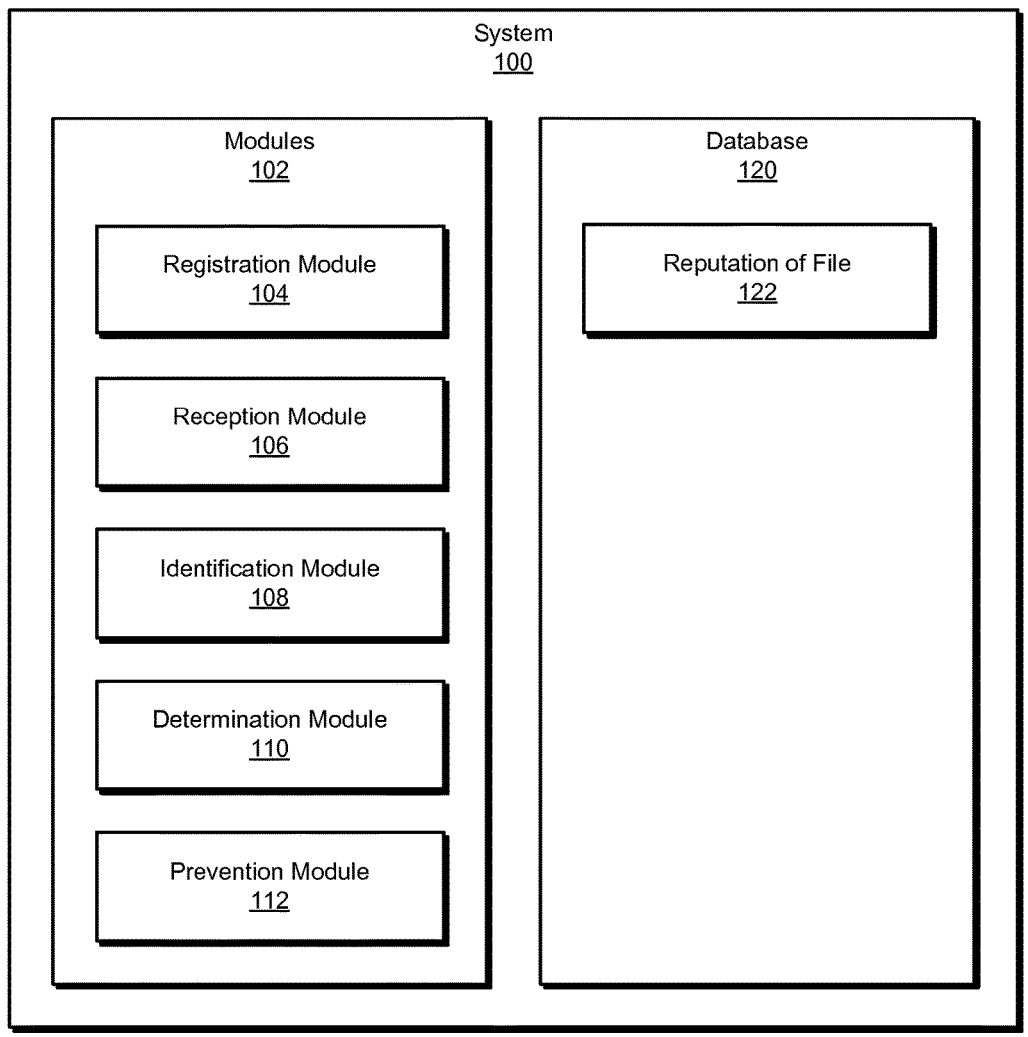
FIG. 1 is a block diagram of an exemplary system for preventing vulnerable files from being opened.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for preventing vulnerable files from being opened. As will be explained in greater detail below, by registering a security application to open any type of file, the systems and methods disclosed herein may scan files of arbitrary file types in order to analyze them for vulnerabilities. For example, by detecting the name of a file, the disclosed systems and methods may identify known security risks associated with the particular file. The disclosed systems and methods may also analyze other applications capable of opening potentially vulnerable files to identify additional security risks.

Figure 2:
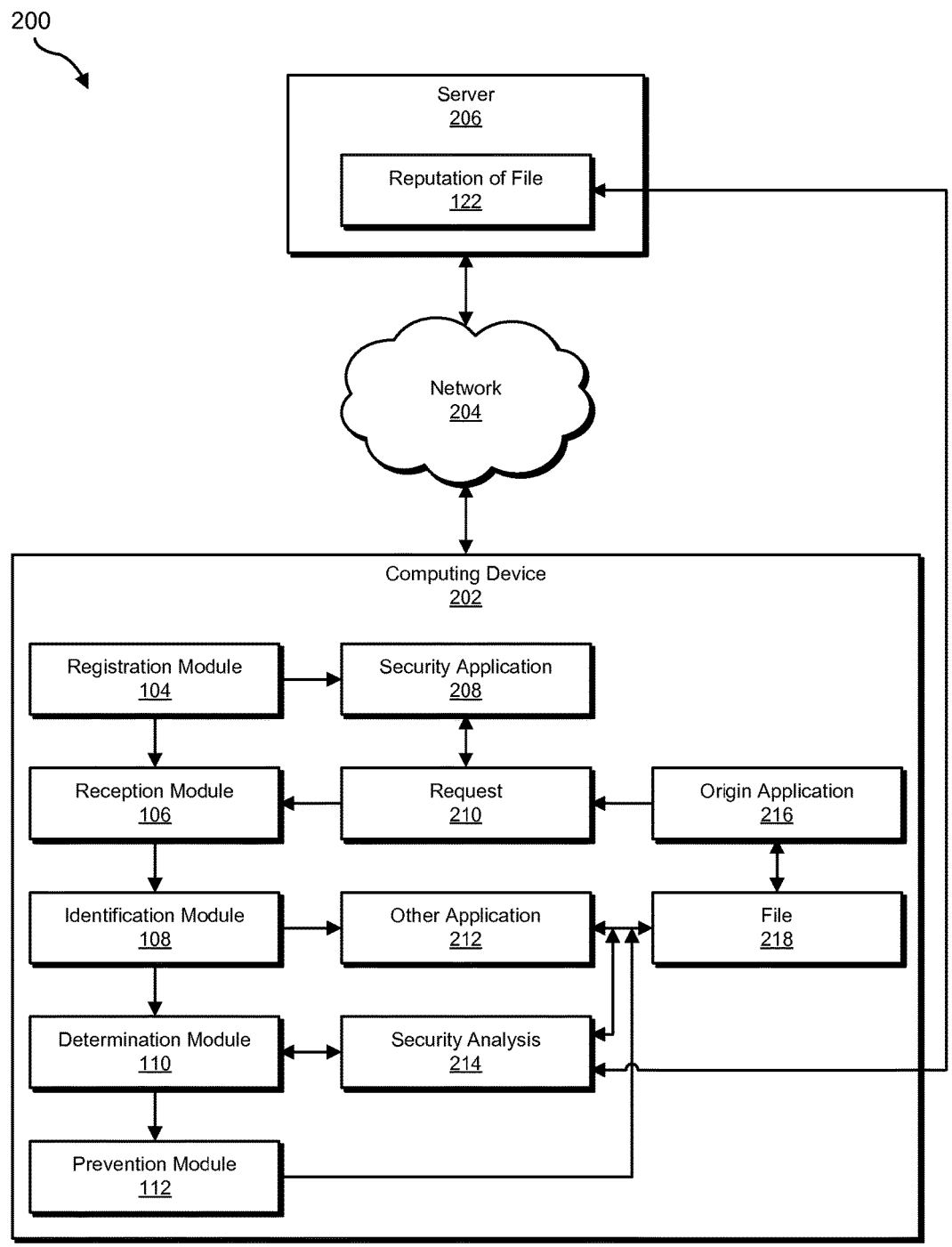
FIG. 2 is a block diagram of an additional exemplary system for preventing vulnerable files from being opened.

The following will provide, with reference to FIGS. 1 and 2, detailed descriptions of exemplary systems for preventing vulnerable files from being opened. Detailed descriptions of corresponding computer-implemented methods will also be provided in connection with FIG. 3. In addition, detailed descriptions of an exemplary automated selection of an exemplary safe application based on a security analysis will be provided in connection with FIG. 4. Furthermore, detailed descriptions of an exemplary computing system and network architecture capable of implementing one or more of the embodiments described herein will be provided in connection with FIGS. 5 and 6, respectively.

FIG. 1 is a block diagram of exemplary system 100 for preventing vulnerable files from being opened. As used herein, the term "vulnerability" generally refers to a potential weakness in a software element that may pose a security risk that can be exploited by an attacker. As illustrated in FIG. 1, exemplary system 100 may include one or more modules 102 for performing one or more tasks. For example, and as will be explained in greater detail below, exemplary system 100 may also include a registration module 104 that may register a security application as a universal file opener.

The term "file opener," as used herein, generally refers to software capable of reading, opening, running, and/or displaying a particular computer file.

Exemplary system 100 may additionally include a reception module 106 that may receive, at the security application, a request to open a file. Exemplary system 100 may also include an identification module 108 that may identify at least one other application on the computing device that may be capable of opening the file. Furthermore, exemplary system 100 may additionally include a determination module 110 that may determine, based on a security analysis, that there may be a security risk in opening the file with the other application that may be capable of opening the file. Finally, exemplary system 100 may include a prevention module 112 that may prevent the other application that may be capable of opening the file from opening the file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a reputation of file 122, which may include information about potential security risks or vulnerabilities of a file to be opened.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120. Similarly, both server 206 and computing device 202 may be merged into a single machine or computing system.

In one embodiment, one or more of modules 102 from FIG. 1 may, when executed by at least one processor of computing device 202 and/or server 206, enable computing device 202 and/or server 206 to identify vulnerabilities in opening files with applications. For example, and as will be described in greater detail below, registration module 104 may register a security application 208 as a universal file opener. Security application 208 may represent any software application capable of providing security features for computing devices. Reception module 106 may then receive, at security application 208, a request 210 to open a file 218. Furthermore, identification module 108 may identify one other application 212 on computing device 202 that is capable of opening file 218. Determination module 110 may then determine, based on a security analysis 214, that there is a security risk in opening file 218 with other application 212. Finally, prevention module 112 may prevent other application 212 from opening file 218.

In the example of FIG. 2, and as will be explained in greater detail below, computing device 202 may first register security application 208 as a universal file opener. Computing device 202 may then receive request 210 from an origin application 216 to open file 218. Next, computing device 202 may identify other application 212 as a file opener for file 218. Computing device 202 may then perform security analysis 214 by querying reputation of file 122 on server 206, via network 204, to identify vulnerabilities in opening file 218 with other application 212. Finally, based on identified vulnerabilities, computing device 202 may prevent other application 212 from being able to open file 218.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of storing and/or analyzing information about file reputation. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
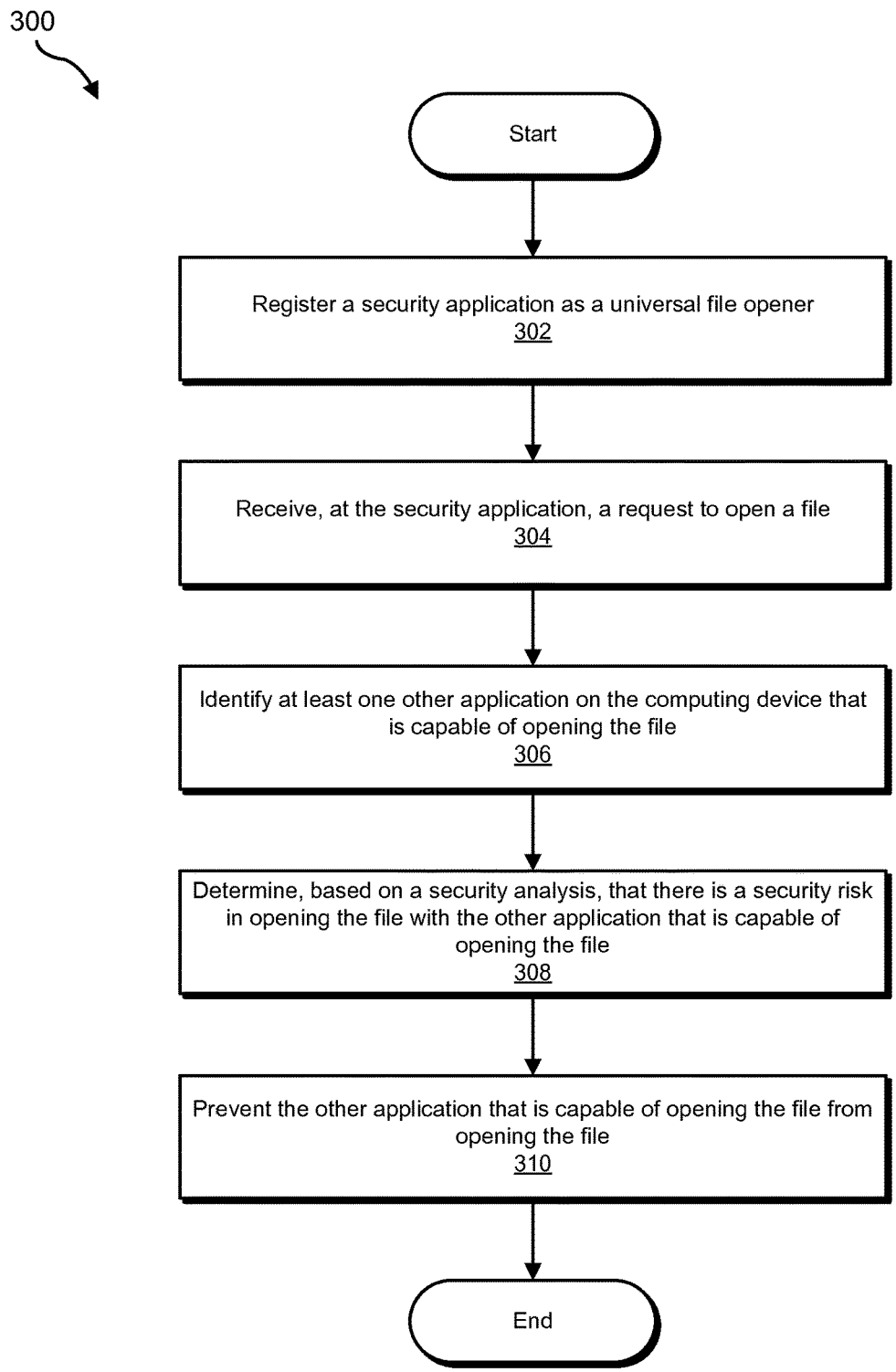
FIG. 3 is a flow diagram of an exemplary method for preventing vulnerable files from being opened.

FIG. 3 is a flow diagram of an exemplary computer-implemented method 300 for preventing vulnerable files from being opened. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may register a security application as a universal file opener. For example, registration module 104 may, as part of computing device 202 in FIG. 2, register security application 208 as a universal file opener.

Registration module 104 may register security application 208 in a variety of ways. In one example, registration module 104 may register security application 208 on computing device 202 as an option for opening any computer file. In another example, registration module 104 may register security application 208 with a provider service, such as a mobile operating system vendor, via network 204. Additionally, registration module 104 may register security application 208 to open all files regardless of filename extension or file format. As used herein, the term "filename extension" generally refers to an indicator in the name of a file that describes a characteristic of the file. The term "file format," as used herein, generally refers to a form of file encoding that dictates how the file is stored and/or opened.

Returning to FIG. 3, at step 304, one or more of the systems described herein may receive, at the security application, a request to open a file. For example, reception module 106 may, as part of computing device 202 in FIG. 2, receive, at security application 208, request 210 to open file 218.

Reception module 106 may receive request 210 in a variety of ways. In one embodiment, request 210 to open file 218 may include a request from a user of computing device 202. In this embodiment, the user may select security application 208 from a list of applications capable of opening file 218. The user may additionally select security application 208 as the default file opener for all or some types of files determined to pose a risk.

In another embodiment, and as shown in the example of FIG. 2, request 210 to open file 218 may include a request from an origin application, such as origin application 216, on computing device 202. In this embodiment, origin application may send all requests to open files, including request 210, to security application 208 by default. Additionally or alternatively, security application 208 may intercept request 210 from origin application 216. In this embodiment, origin application 216 may attempt to open file 218 and/or request a different application, such as other application 212, to open file 218. Security application 208 may then intercept the attempt to open file 218. File 218 may be downloaded via network 204 by a user or by the origin application, or file 218 may already exist on computing device 202.

Returning to FIG. 3, at step 306, one or more of the systems described herein may identify at least one other application on the computing device that is capable of opening the file. For example, identification module 108 may, as part of computing device 202 in FIG. 2, identify other application 212 on computing device 202 that is capable of opening file 218.

Identification module 108 may identify other application 212 in a variety of ways. In some examples, identification module 108 may identify other application 212 when it is attempting to open file 218. In other examples, identification module 108 may identify other application 212 by detecting a file type for file 218 and determining that other application 212 is registered as a file opener for the file type. The term "file type," as used herein, generally refers to a way of differentiating between various file encodings and types of data contained in computer files. Examples of file types may include, without limitation, filename extensions, file formats, file signatures, or any other method of identifying file content.

Returning to FIG. 3, at step 308, one or more of the systems described herein may determine, based on a security analysis, that there is a security risk in opening the file with the other application that is capable of opening the file. For example, determination module 110 may, as part of computing device 202 in FIG. 2, determine, based on security analysis 214, that there is a security risk in opening file 218 with other application 212.

Determination module 110 may determine that there is a security risk in a variety of ways. In one embodiment, security analysis 214 may include an analysis of file 218. In this embodiment, the analysis of file 218 may include a security scan of file 218, detection of the file name of file 218, an analysis of reputation of file 122 based on the file name, and/or an analysis of an origin of the file. For example, security analysis 214 may determine that reputation of file 122 indicates file 218 has a low security rating. Reputation of file 122 may be based on a past history of file 218 or aggregate information about similar files. As another example, security analysis 214 may determine that file 218 originates from an unsafe provider. In this example, security analysis 214 may determine a website used to download file 218 has a high risk of malware.

In another embodiment, security analysis 214 may include an analysis of other application 212 that is capable of opening file 218. In this embodiment, security analysis 214 may determine that other application 212 poses a security risk. Additionally or alternatively, security analysis 214 may include an evaluation of a risk of opening file 218 with other application 212. For example, security analysis 214 may determine that other application 212 has vulnerabilities that may be exploited by certain file types, including the file type of file 218. Security analysis 214 may also determine that file 218 targets certain applications, such as other application 212.

Furthermore, part or all of security analysis 214 may be executed on computing device 202, as in the example of FIG. 2, and/or on server 206. For example, server 206 may receive information about file 218 and analyze reputation of file 122 based on the received information. Server 206 may then transmit security analysis 214 to computing device 202 via network 204. Additionally, reputation of file 122 may reside on server 206 and/or be stored on computing device 202.

Returning to FIG. 3, at step 310, one or more of the systems described herein may prevent the other application that is capable of opening the file from opening the file. For example, prevention module 112 may, as part of computing device 202 in FIG. 2, prevent other application 212 from opening file 218.

Prevention module 112 may prevent other application 212 from opening file 218 in a variety of ways. In some examples, prevention module 112 may block vulnerable applications, such as other application 212, from opening files. In other examples, prevention module 112 may quarantine files with security risks, such as file 218, to prevent them from being opened by any application. Additionally or alternatively, prevention module 112 may prevent only the specific combination of other application 212 opening file 218.

In one embodiment, one or more of the systems described herein may include identifying, based on security analysis 214, at least one safe application on computing device 202 that is capable of opening file 218 and sending, based on a selection of the safe application, request 210 to open file 218 to the safe application. In this embodiment, the selection of the safe application may include a choice of the safe application by a user of the computing device and/or an automated selection of the safe application. Furthermore, in this embodiment, the automated selection may include a determination that the safe application is the best application on computing device 202 to open file 218 based on a predetermined metric.

Figure 4:
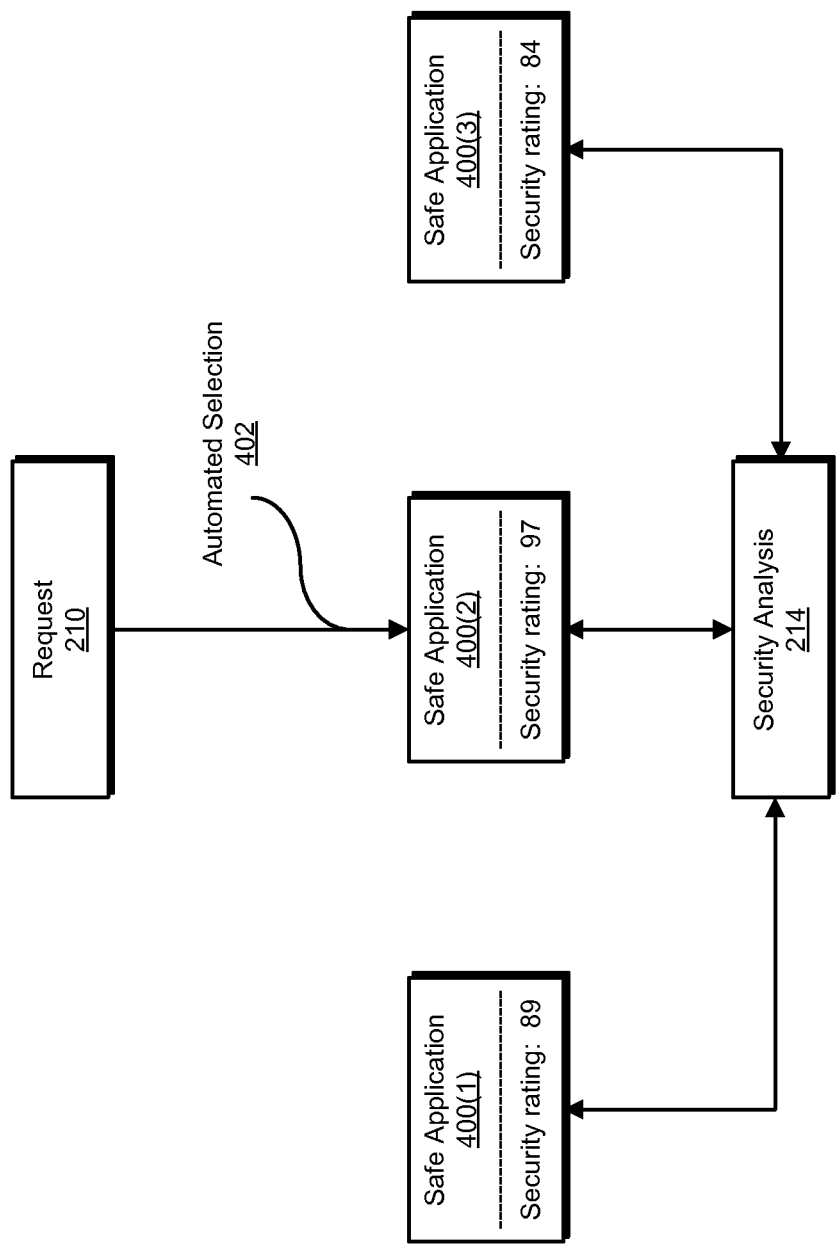
FIG. 4 is an illustration of an exemplary automated selection of an exemplary safe application based on a security analysis.

For example, as shown in FIG. 4, security analysis 214 may identify several applications that are safe to open file 218, including safe applications 400(1), 400(2), and 400(3). In this example, security analysis 214 may further determine safe application 400(2) to be the best application to open file 218 based on the predetermined metric of a higher security rating (e.g., 97) than safe application 400(1) (e.g., 89) or safe application 400(3) (e.g., 84). Computing device 202 may then send request 210 to open file 218 to safe application 400(2) based on an automated selection 402 of the highest security rating.

In the above example, security analysis 214 may determine safe applications 400(1), 400(2), and 400(3) to be safe based on high security ratings. Security analysis 214 may determine that all applications that do not pose a security risk are considered safe. Alternatively, security analysis 214 may determine that file 218 does not pose a security risk and may then be safely opened by applications on computing device 202. Various other predetermined metrics may also be used to determine if an application is safe or to automatically select an application. For example, automated selection 402 may alternatively select safe application 400(2) based on performance metrics, user preference, or a combination of factors. Furthermore, security analysis 214 may determine no safe applications exist on computing device 202 and prevent the opening of file 218.

As explained above in connection with method 300 in FIG. 3, the disclosed systems and methods may, by vetting files that may be opened with applications on a computing device, prevent potential security risks caused by malicious files. Specifically, the disclosed systems and methods may first register a security application as an opener for any file type. The disclosed systems and methods may then be used to open a potentially vulnerable file. For example, the systems and methods described herein may select the security application as a default opener for all suspicious files. In another example, the systems and methods described herein may allow a user to select the security application during an attempt to open the potentially vulnerable file.

The disclosed systems and methods may further analyze the potentially vulnerable file to detect security risks. In the above example, the systems and methods disclosed herein may scan the file and use the name of the file to search for known risks associated with the file. When a risk is detected, the systems and methods described herein may then block the file from being opened on the computing device. Alternatively, the disclosed systems and methods may determine the file is not a risk. In this example, the systems and methods described herein may analyze applications capable of opening the file for further risk and prevent vulnerable applications from opening the file. Safe applications may be included in a list of applications shown to the user, who can then decide which application to use to open the file, or a best application may be automatically selected.

As detailed above, by evaluating files prior to opening them with applications, the disclosed systems and methods may detect and prevent malicious files from being opened by vulnerable software applications. In addition, by incorporating the security application into existing solutions like mobile data management systems, the disclosed systems and methods may be able to enforce security policies for computing devices. Thus, the systems and methods described herein may provide better controls over files that traditional security may not be able to examine.

Figure 5:
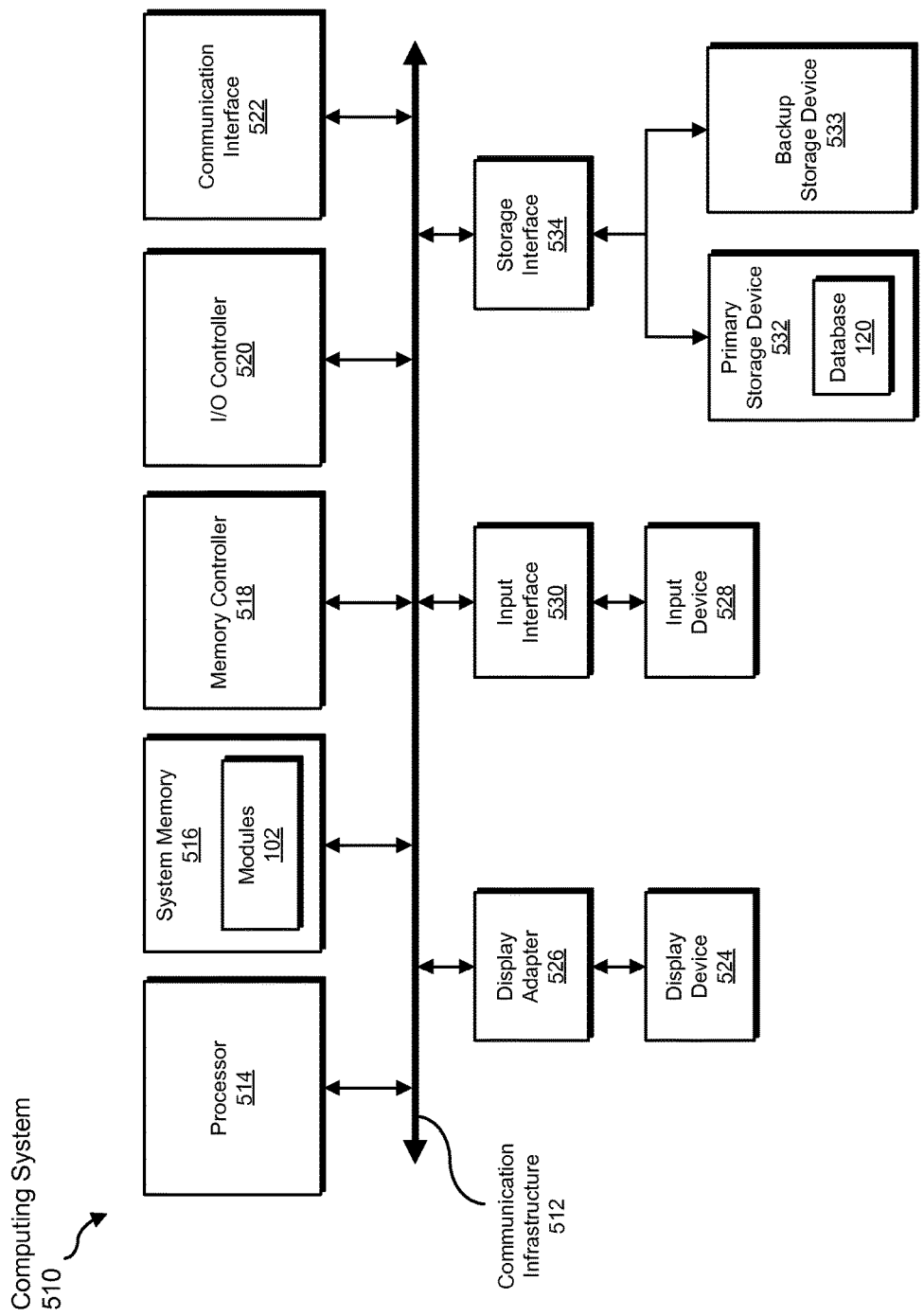
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
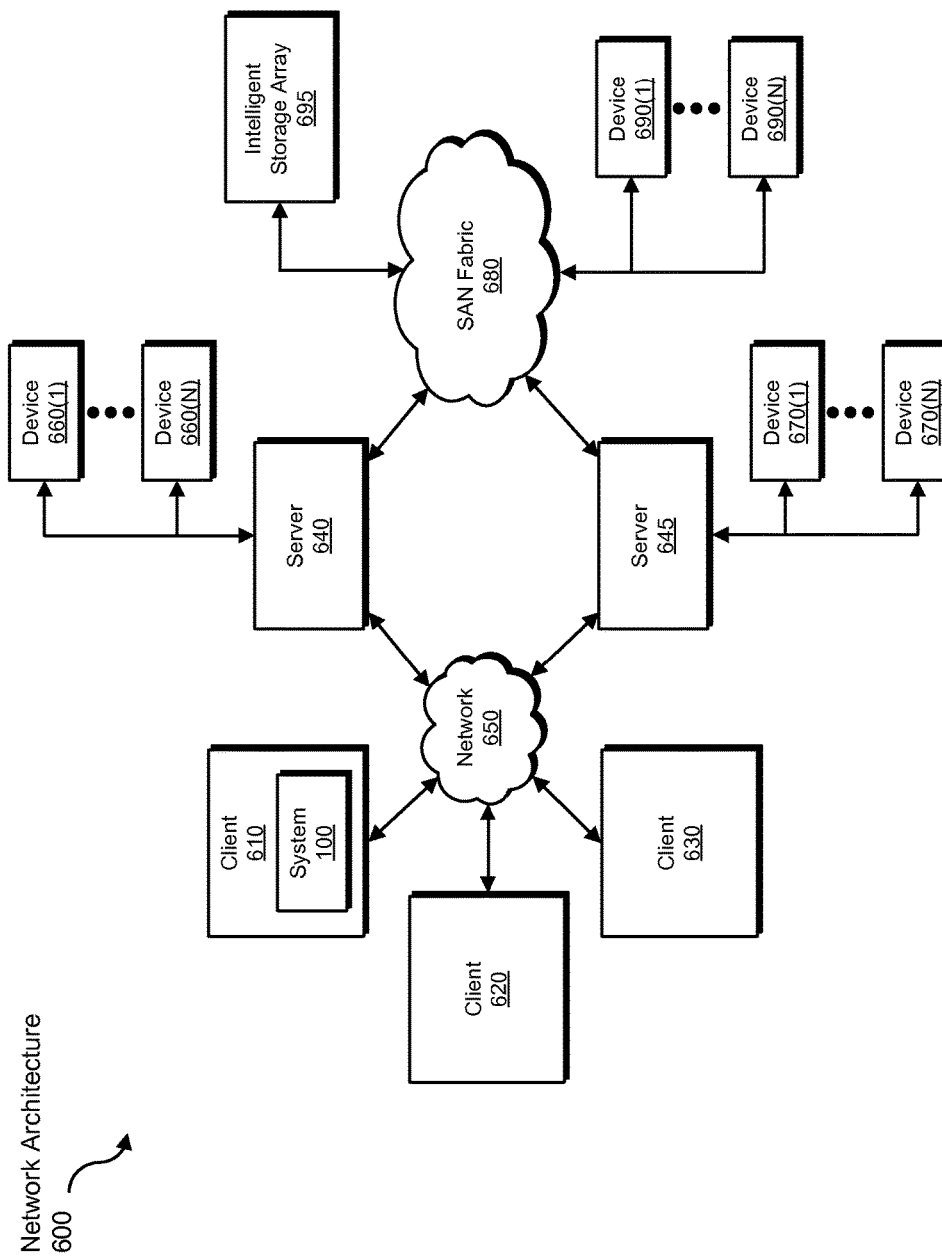
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for preventing vulnerable files from being opened.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a name of a computer file to be transformed, transform the name, output a result of the transformation to a storage or output device, use the result of the transformation to identify a security risk in the computer file, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing vulnerable computer files from being opened, at least a portion of the method being performed by a computing device comprising at least one processor, wherein the computing device is one of one or more computing devices, the method comprising:
    registering, by the computing device, a security application as a universal file opener for types of files determined to pose a risk;
    receiving, at the security application of the computing device, a request to open a computer file;
    identifying, by the computing device, another application on the computing device that is capable of opening the computer file;
    performing, by the security application of the computing device, a security analysis of the other application and of the computer file;
    determining, by the computing device based on the security analysis, that there is a security risk in the combination of opening the computer file with the other application; and
    enforcing, by the security application of the computing device, a security policy that prevents the other application from opening the computer file by:
        identifying, based on an analysis of a list of applications on the computing device that are capable of opening the computer file, at least one safe application from the list of applications that is capable of opening the computer file without posing a security risk; and
        sending, based on a selection of the safe application, the request to open the computer file from the universal file opener to the safe application.

2. The method of claim 1, wherein the request to open the computer file comprises a request from at least one of:
    a user of the computing device; and
    an origin application on the computing device.

3. The method of claim 1, wherein identifying the other application that is capable of opening the computer file comprises:
    detecting a file type for the computer file; and
    determining that the other application is registered as a file opener for the file type.

4. The method of claim 1, wherein the security analysis comprises at least one of:
    an analysis of the computer file;
    an analysis of the other application that is capable of opening the computer file; and
    an evaluation of a risk of opening the computer file with the other application that is capable of opening the file.

5. The method of claim 4, wherein the analysis of the computer file comprises at least one of:
    a security scan of the computer file;
    detection of the file name;
    an analysis of a reputation of the computer file based on the file name; and
    an analysis of an origin of the computer file.

6. The method of claim 1, wherein identifying the safe application on the computing device comprises performing the security analysis on the safe application to determine that the safe application is capable of safely opening the computer file.

7. The method of claim 1, wherein the selection of the safe application comprises at least one of:
    a choice of the safe application by a user of the computing device; and
    an automated selection of the safe application to open the computer file.

8. The method of claim 7, wherein the automated selection comprises a determination that the safe application is the best application on the computing device to open the computer file based on a predetermined metric.

9. A system for preventing vulnerable computer files from being opened, the system comprising:
    a registration module, stored in memory, that registers, by at least one computing device, a security application as a universal file opener for types of files determined to pose a risk;

a reception module, stored in memory, that receives, at the security application of the computing device, a request to open a computer file;

an identification module, stored in memory, that identifies, by the computing device, another application on the computing device that is capable of opening the computer file;

a determination module, stored in memory, that:
performs, by the security application of the computing device, a security analysis of the other application and of the computer file; and
determines, by the computing device based on the security analysis, that there is a security risk in the combination of opening the computer file with the other application;

a prevention module, stored in memory, that enforces, by the security application of the computing device, a security policy that prevents the other application from opening the computer file by:
identifying, based on an analysis of a list of applications on the computing device that are capable of opening the computer file, at least one safe application from the list of applications that is capable of opening the computer file without posing a security risk; and
sending, based on a selection of the safe application, the request to open the computer file from the universal file opener to the safe application; and at least one processor that executes the registration module, the reception module, the identification module, the determination module, and the prevention module.

10. The system of claim 9, wherein the request to open the computer file comprises a request from at least one of:
a user of the computing device; and
an origin application on the computing device.

11. The system of claim 9, wherein the identification module identifies the other application that is capable of opening the computer file by:
detecting a file type for the computer file; and
determining that the other application is registered as a file opener for the file type.

12. The system of claim 9, wherein the security analysis comprises at least one of:
an analysis of the computer file;
an analysis of the other application that is capable of opening the computer file; and
an evaluation of a risk of opening the computer file with the other application that is capable of opening the file.

13. The system of claim 12, wherein the analysis of the computer file comprises at least one of:
a security scan of the computer file;
detection of the file name;
an analysis of a reputation of the computer file based on the file name; and
an analysis of an origin of the computer file.

14. The system of claim 9, wherein identifying the safe application on the computing device comprises performing the security analysis on the safe application to determine that the safe application is capable of safely opening the computer file.

15. The system of claim 9, wherein the selection of the safe application comprises at least one of:

a choice of the safe application by a user of the computing device; and
an automated selection of the safe application to open the computer file.

16. The system of claim 15, wherein the automated selection comprises a determination that the safe application is the best application on the computing device to open the computer file based on a predetermined metric.

17. A non-transitory computer-readable medium comprising one or more computer-executable instructions that, when executed by at least one processor of a computing device, wherein the computing device is one of one or more computing devices, cause the computing device to:
register, by the computing device, a security application as a universal file opener for types of files determined to pose a risk;
receive, at the security application of the computing device, a request to open a computer file;
identify, by the computing device, another application on the computing device that is capable of opening the computer file;
perform, by the security application of the computing device, a security analysis of the other application and of the computer file;
determine, by the computing device based on the security analysis, that there is a security risk in the combination of opening the computer file with the other application; and
enforce, by the security application of the computing device, a security policy that prevents the other application from opening the computer file by:
identifying, based on an analysis of a list of applications on the computing device that are capable of opening the computer file, at least one safe application from the list of applications that is capable of opening the computer file without posing a security risk; and
sending, based on a selection of the safe application, the request to open the computer file from the universal file opener to the safe application.

18. The non-transitory computer-readable medium of claim 17, wherein the request to open the computer file comprises a request from at least one of:
a user of the computing device; and
an origin application on the computing device.

19. The non-transitory computer-readable medium of claim 17, wherein the computer-executable instructions cause the computing device to identify the other application that is capable of opening the computer file by:
detecting a file type for the computer file; and
determining that the other application is registered as a file opener for the file type.

20. The non-transitory computer-readable medium of claim 17, wherein the security analysis comprises at least one of:
an analysis of the computer file;
an analysis of the other application that is capable of opening the computer file; and
an evaluation of a risk of opening the computer file with the other application that is capable of opening the computer file.

* * * * *